Nov. 28, 1961  R. J. BUCK ET AL  3,010,478
SANITARY PIPE LINE TRANSFER SYSTEM WITH
SELECTIVELY POSITIONABLE VALVE
Filed July 17, 1959

INVENTORS
WALTER W. SHUTE
ROBERT J. BUCK

BY Beale & Jones

ATTORNEYS

United States Patent Office 3,010,478
Patented Nov. 28, 1961

3,010,478
SANITARY PIPE LINE TRANSFER SYSTEM WITH SELECTIVELY POSITIONABLE VALVE
Robert J. Buck and Walter W. Shute, La Fayette, N.Y.
Filed July 17, 1959, Ser. No. 827,928
3 Claims. (Cl. 137—561)

This invention relates to a transfer pipe line system for milk and the like which incorporates a selectively positionable valve in spaced apart apertures in the system for directing flow and sealing the valve in the transfer pipe.

In the handling of edible fluids such as milk and the like in the transfer pipe lines, it is customary to provide spaced apart T-fittings along the transfer pipe and to couple a secondary hose or pipe to such fittings. In carrying out this practice there is no way of preventing flow of fluid in an undesired direction in the transfer pipe line when introducing fluid thereto from the secondary hose or pipe and thus an undesired condition occurs, the milk or other fluid remains stagnant in the portion of the transfer pipe or conduit where flow is not wanted. This tends to permit the rapid growth of bacteria, and if the fluid is milk, for example, and it remains in the pipe for a sufficient time it is apt to dry on the interior of the pipe and create a very difficult cleaning problem.

An object of the invention is to provide a removable valve connection for insertion in spaced apart apertures in a transfer conduit so that a secondary conduit may be attached to the inserted valve, and the valve is positionable to direct fluid flow in a single direction and at the same time to provide a seal between the valve and the transfer conduit to prevent flow in an undesired direction in the transfer conduit.

Another object of the invention is to provide a fluid transfer system wherein a fluid transfer pipe has spaced apart apertures whose axes extend perpendicular to the axis of the transfer pipe and there is formed on the transfer pipe about the apertures a planar faced built up surface to receive a removable valve for connecting a secondary conduit and wherein the valve has a transversely arranged fluid passageway at its insertable end that communicates with the axial passageway of the valve having the form of a nipple that has the inserted end and adjacent portion covered with resilient sealing material so that an interior seal between valve and transfer pipe is formed and a seal is formed with the planar surface about the aperture.

A still further object of the invention is to provide a transfer pipe with a plurality of spaced apart apertures extending therein and a valve insertable in the apertures and having clamp means to hold valve inserted and the valve seals off flow of fluid in one direction in the transfer pipe and directs fluid in the opposite direction in the transfer pipe.

Yet another object of the invention is to provide an insertable valve unit for an aperture extending in a pipe wall generally perpendicular to the axis of the pipe with the valve unit having a relatively short length nipple with an annular transverse flange spaced from the inserted end, the inserted end having an end closure and a side opening thereadjacent directed to lie in the axis of the pipe and a resilient covering over the inserted end to form a seal with the interior of the pipe thereadjacent and the aperture through the wall and abutting against the annular flange and means are attached to the flange to clamp the valve unit to the pipe in its inserted position whereby fluid entering the pipe through the nipple is directed in the pipe in one direction and sealed from flow in the pipe in the opposite direction.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which—

Throughout the description like reference numbers refer to similar parts.

Figure 1:
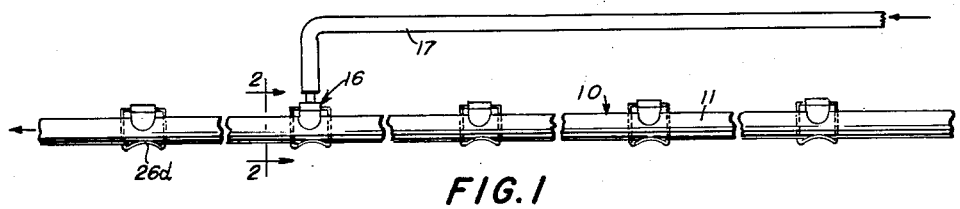
FIG. 1 is a top plan view of a transfer pipe line having apertures extending to one side and a valve inserted in one of the apertures and having a secondary conduit attached thereto.
Figure 2:
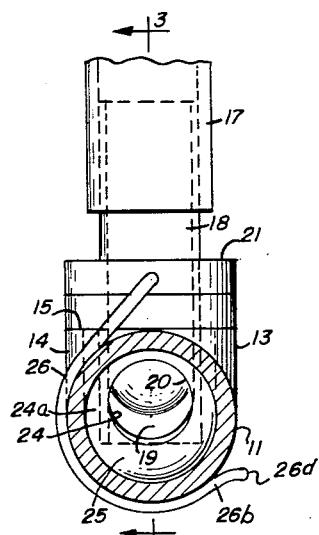
FIG. 2 is a sectional view of the transfer pipe line and inserted valve along line 2—2 of FIG. 1 on an enlarged scale.

A pipe line system for transferring fluids is generally indicated at 10 and comprises a transfer conduit 11 to receive fluids. Conduit 11 has a plurality of spaced apart apertures 12 therein extending generally perpendicular to the longitudinal axis of conduit 11. Each aperture 12 has formed thereadjacent a semicircular walled portion 13 on one side and 14 on the opposite side thereto with the outer and planar surface 15 extending parallel to the longitudinal axis through the conduit 11. This pipe or conduit 11 may be of stainless steel or glass, for example, to form a satisfactory medium for transfer of such edible fluids, as milk.

A valve unit generally indicated at 16 serves to connect a secondary conduit 17 to the transfer conduit 11 in the system of piping and to direct the flow into conduit 11 while sealing off flow in the opposite direction.

The valve 16 is of stainless steel or the like and comprises a relatively short length nipple 18 formed with a closed inner or inserted end 19 and an opening 20 whose axis lies generally in line with the longitudinal axis through pipe 11. Formed on the nipple 18 in spaced relation from the inserted end portion is a transverse annular collar 21. Covering the inserted end and extending about the nipple as it passes through aperture 12 and overlapping the aperture 12 exterior thereof is a resilient covering of rubber or the like generally indicated at 22. The overlapping portion 23 of the covering 22 abuts the planar face 15 of the apertured opening in conduit 11 and abuts the adjacent planar surface of the collar 21 at 21a. The shaped outer surface of the resilient covering 22 conforms to the abutting curvature of the interior of the conduit 11 at the locus of the valve insertion. The covering 22 is cut away at 24 so that a clear opening is formed with the opening 20 of the nipple 18. The portion of the covering indicated at 25 might be considered somewhat as a portion of a hemisphere where it overlies the inner closed end 19 of the nipple. Note at 25a that the covering 22 seals tightly with the adjacent interior portion of pipe 11. The portion of the covering 24a adjacent the aperture 24 therein generally conforms to the interior curvature of the pipe 11 to form a seal therewith.

Figure 3:
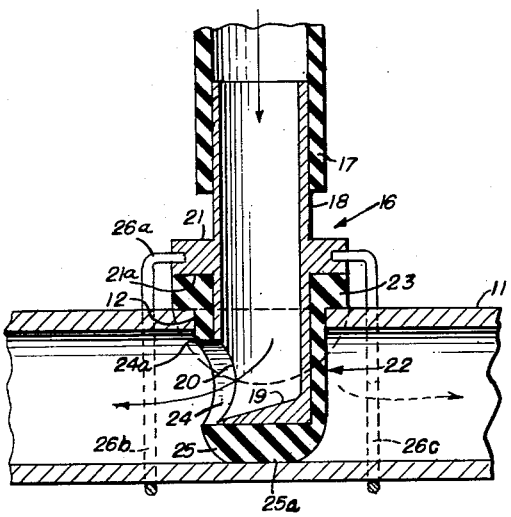
FIG. 3 is a cross sectional view of the pipe line and valve along line 3—3 of FIG. 2.

The positioning of the valve 16 in the aperture directs flow in the direction of the arrow, see FIG. 3, to the left when so positioned while sealing off flow in the opposite direction.

The arrow to the right shows a reverse flow when the valve is inserted in a reversed position from that shown in FIG. 3.

There is provided a clamp or bail 26 having inturned ears 26a received pivotally in apertures 21a in collar 21 while the remainder of the clamp is formed in arcuate shape along the two legs 26b and 26c and a bight portion 26d integrally joins the outer ends of the two legs. Thus, in installing the valve 16, the leading end carrying the resilient portion is inserted into aperture 12 and the clamp 26 is snapped into position over the opposite portion of conduit 11 from the apertured side at 12. The resilient covering 22 is compressed into a tight fit against any abutting surfaces of pipe 11.

The valve unit 16 is easily inserted in a selected aperture 12 as would, for example, be nearest a container of milk in a dairy barn that is to be sucked or otherwise introduced into transfer pipe line 11 for further transfer in a selected direction of flow. In inserting the valve, the aperture 20 and 24 therein is oriented in the direction of desired flow.

Figure 4:
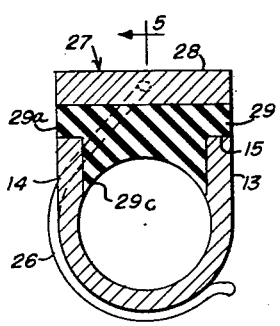
FIG. 4 is a view similar to FIG. 2 as taken along line 4—4 of FIG. 5 but with a plug inserted to close the aperture in the pipe.
Figure 5:
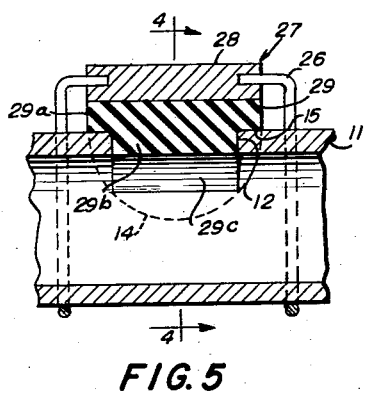
FIG. 5 is a view similar to FIG. 3 as taken along line 5—5 of FIG. 4 but showing a plug inserted to close the aperture in the pipe.

In FIGURES 4 and 5 there is illustrated a closure plug generally indicated at 27 that is utilized with the apertures 12 when the valve unit 16 is not inserted. The plug 27 may be formed with a cylindrical metal cap 28 of similar size to that of the annular flange 21 of valve 16. To one face of cap 28 is secured a formed plug 29 of rubber or the like having a cylindrical top portion 29a secured to the lower face of cap 28 and of such size to overlap aperture 12 in pipe 11. The bottom portion 29b of the resilient plug portion 29 extends through aperture 12 in a tight fitting and sealing manner to prevent any leakage and the face of the inserted surface 29c is shaped to conform to the interior curvature of the pipe to permit a smooth contour and unobstructed flow through pipe 11.

A clamp member 26 like that for the valve member 16 is attached to the cylindrical metal cap 28 and is adapted to clamp about pipe 11 so as to hold the plug tightly inserted. The metal cap portion 28 may be of stainless steel or other suitable non-corrosive metal. Likewise the nipple 18 of the valve 16 may be of a non-corrosive material.

The system herein provided including the transfer pipe 11 with its spaced aperture, the insertable valve member 12 and the closure plug have smooth and contoured surfaces that permit easy cleaning after use as is essential particularly in handling edible fluids. There are no threads or rough indentations in the valve or plug or the transfer line with its shouldered apertures 12 where milk or foreign material would be likely to collect.

The system and its apparatus are of particular importance in the handling of milk flow in a most sanitary manner by insuring that milk does not flow in an undesired direction in the transfer line 11.

We claim as our invention:

1. A sanitary pipe line transfer system for milk comprising in combination a fluid transfer conduit formed with a laterally extending portion having a smooth cylindrical bore extending in angular relation to the axis of said conduit and communicating therewith, a cylindrical tubular member formed of rubber closed at one end and having an outer diameter comparable to the bore in said laterally extending portion whereby said member may be readily inserted in said bore, the inner closed end of said member being formed on a curvature comparable to the inner wall surface of said conduit, the outer opposite end of said member extending outwardly from said laterally extending portion upon initial engagement of said closed end of said member with the wall of said conduit, a straight rigid tubular nipple positioned in said member and having a radial shoulder engaging the outer end of said tubular rubber member, clamp means mounted externally of said nipple and conduit and cooperable therewith to exert pressure on said nipple in an axial direction thereof to axially compress said member against the inner wall of said conduit and effect radial expansion of said member in said bore, said member being formed with an aperture extending through the side wall thereof adjacent said closed end and communicating with said nipple to provide a passage for the flow of fluid from said nipple into said conduit when the axis of said aperture extends in a direction lengthwise of said conduit.

2. A sanitary pipe line transfer system for milk comprising in combination a fluid transfer conduit formed with a laterally extending portion having a smooth cylindrical bore extending normal to the axis of said conduit and communicating therewith, a cylindrical tubular member formed of rubber closed at one end and having an outer diameter comparable to the bore in said laterally extending portion whereby said member may be readily inserted in said bore, the inner closed end of said member being formed on a curvature comparable to the inner wall surface of said conduit, the outer opposite end of said member being formed with a radial flange adapted to overlay the outer end of said laterally extending portion, a straight tubular nipple positioned in said member, said nipple being formed with a radial flange abutting the flange of said member, clamp means movably attached to the flange of said nipple and being cooperable with said conduit to urge said nipple inwardly and to exert pressure against the flange of said member in an axial direction thereof to compress the closed end of said member against the inner wall of said conduit and to effect radial expansion of said member in said bore, said tubular rubber member being formed with an aperture extending through the side wall thereof adjacent said closed end and communicating with said nipple to provide a passage for the flow of fluid from said nipple into said conduit when the axis of said aperture extends in a direction parallel to the axis of said conduit.

3. A sanitary pipe line transfer system for milk comprising in combination a fluid transfer conduit formed with a laterally extending portion having a smooth cylindrical bore extending normal to the axis of said conduit and communicating therewith, a cylindrical tubular member formed of rubber closed at one end and having an outer diameter comparable to the bore in said laterally extending portion whereby said member may be readily inserted in said bore, the inner closed end of said member being formed on a curvature comparable to the inner wall surface of said conduit, the outer end of said member extending outwardly a short distance beyond the outer end of said laterally extending portion when the inner end of said member is positioned against the inner wall of the conduit, a rigid tubular nipple positioned in said member and being formed with a radial flange abutting the flange of said member, the inner end of said nipple being seated against the closed end of said member, clamp means carried by said nipple and operable to move said nipple inwardly to compress the inner closed end of said member against the wall of said conduit and to expand said member against the bore of said laterally extending portion, the inner portion of said nipple being formed with an aperture extending through the side wall thereof adjacent the end thereof, said member being formed with an aperture extending through the side wall thereof adjacent said closed end, said apertures being arranged in alinement to provide a passage for the flow of fluid from said nipple into said conduit when the axes of said apertures are disposed parallel to the axis of said conduit.

References Cited in the file of this patent

UNITED STATES PATENTS

| | | |
|---|---|---|
| 569,967 | Friede | Oct. 20, 1896 |
| 2,240,074 | Kain | Apr. 2, 1941 |
| 2,564,402 | MacArthur | Aug. 14, 1951 |
| 2,693,337 | Williamson | Nov. 2, 1954 |

FOREIGN PATENTS

| | | |
|---|---|---|
| 415,495 | Germany | June 27, 1925 |
| 425,082 | Great Britain | Mar. 6, 1935 |